Sept. 1, 1936.　　　T. R. HARRISON　　　2,052,764
MEASURING APPARATUS
Filed June 25, 1930　　　3 Sheets-Sheet 1

INVENTOR.
THOMAS R. HARRISON
BY John E. Hubbell
ATTORNEY

Sept. 1, 1936.                T. R. HARRISON                2,052,764
                            MEASURING APPARATUS
                            Filed June 25, 1930                3 Sheets-Sheet 2
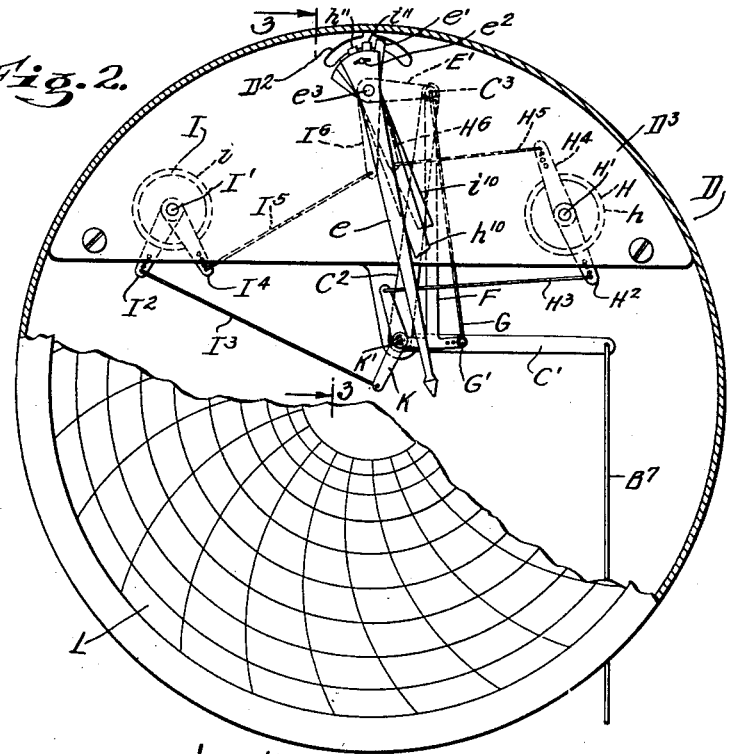
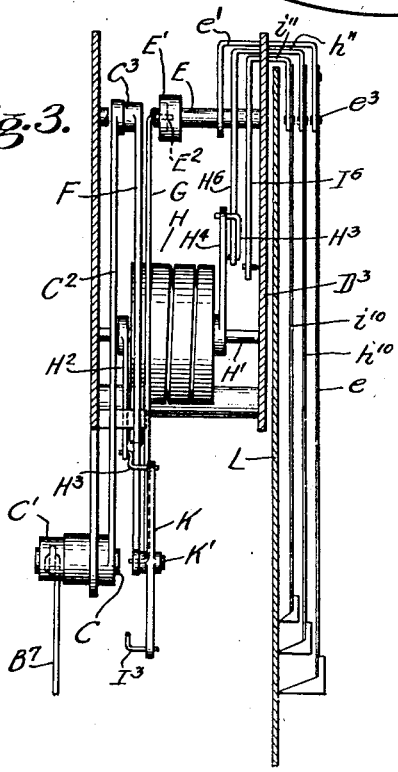
INVENTOR.
THOMAS R. HARRISON
BY John E. Hubbell
ATTORNEY Sept. 1, 1936.   T. R. HARRISON   2,052,764
MEASURING APPARATUS
Filed June 25, 1930   3 Sheets-Sheet 3

INVENTOR.
THOMAS R. HARRISON
BY John E. Hubbell
ATTORNEY

Patented Sept. 1, 1936

2,052,764

UNITED STATES PATENT OFFICE 2,052,764

MEASURING APPARATUS

Thomas R. Harrison, Wyncote, Pa., assignor to The Brown Instrument Company, Philadelphia, Pa., a corporation of Pennsylvania Application June 25, 1930, Serial No. 463,633

19 Claims. (Cl. 73—206)

My present invention relates to measuring apparatus in which it is desirable to modify the direct measure made of one quantity in response to changes in the value of one or more related quantities, and the general object of the present invention is to provide measuring apparatus for the purpose specified, comprising simple and effective provisions for automatically modifying the direct measurement of the first mentioned quantity as required to compensate for variations in the related quantity or quantities.

While not restricted to such use, my invention was primarily devised for use, and is of especial utility in measuring fluid flow under circumstances making it desirable to compensate for variations in the quality of the fluid flowing, i. e., variations in temperature or pressure, or in both temperature and pressure.

In measuring the flow of a gaseous fluid as natural gas or superheated steam, by directly measuring a pressure differential which is a function of the rate of flow, account must be taken both of the pressure and temperature of the fluid in order that said pressure differential may correctly indicate the weight rate of flow, as is generally desirable. When the fluid so measured is saturated steam, compensation responsive to either pressure or temperature changes is ordinarily sufficient. In measuring the flow of a liquid in the manner described no compensation for pressure variations is ordinarily required, but compensation for variations in liquid temperature may be desirable.

In accordance with the present invention, relatively simple and effective means responsive to fluid temperature or pressure, or both temperature and pressure, are employed to automatically adjust mechanical connections through which a movable element of the pressure differential measuring mechanism transmits movement to the exhibiting mechanism of the measuring apparatus, to thereby change the ratio of said movements as required to compensate for variations in the quality of the fluid from a predetermined or normal value.

While flow meters have heretofore been provided with means for automatically compensating for changes in flow quality, such prior provisions, so far as I am aware, have all been different in character from those devised by me. My improvement is, I believe, substantially simpler and better adapted for its intended use than anything heretofore known and of similar effectiveness and accuracy.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:—

Fig. 2 is an elevation with parts broken away of the meter or exhibiting instrument shown diagrammatically in Fig. 1;

Fig. 3 is a partial section on the line 3—3 of Fig. 2;

Figure 1:
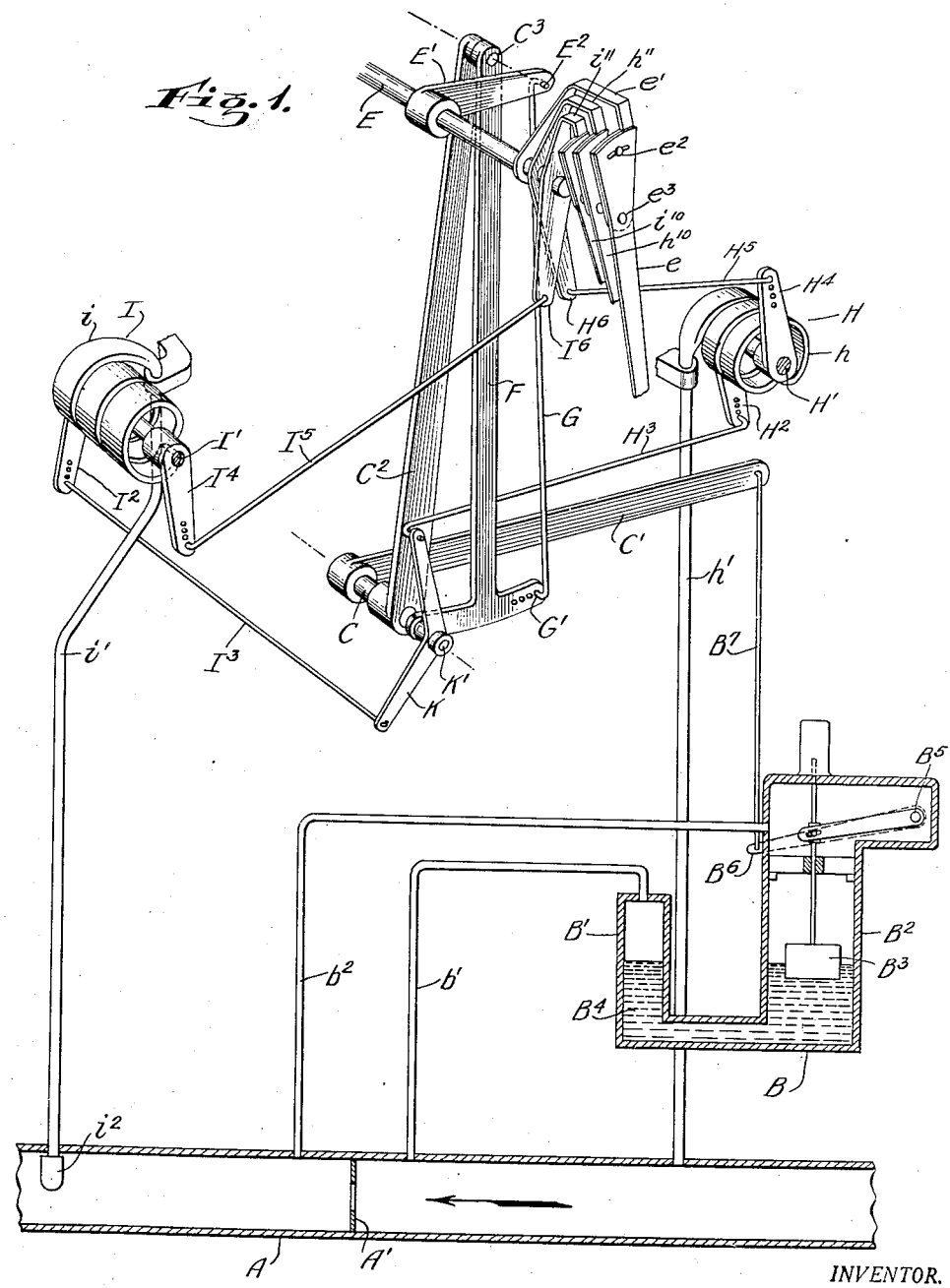
Fig. 1 is a diagrammatic representation of flow measuring apparatus.

In the drawings, and referring first to Fig. 1, A represents a conduit, the flow of fluid through which is to be measured. B represents a differential pressure gage or manometer having its high pressure leg B' connected to the conduit A at the high pressure side of a measuring orifice A' therein by a pressure transmitting connection $b'$. The low pressure leg $B^2$ of the manometer B is connected to the conduit A at the low pressure side of the orifice A' by a pressure transmitting connection $b^2$. $B^3$ designates a float rising and falling with the changes in level of the manometer sealing liquid $B^4$, ordinarily mercury, in the low pressure leg $B^2$ of the manometer.

In the form shown, the float $B^3$ is carried by an arm secured to a rock shaft $B^5$ projecting through the wall of the manometer and provided externally of the latter with an arm $B^6$. The arm $B^6$ is connected by a link $B^7$ to the main actuating arm C' of the flow exhibiting mechanism or instrument D. As shown, the arm C' is carried by a rock shaft C journaled in the instrument framework. The shaft C is connected to, and oscillates the instrument shaft E which carries and gives motion to the flow indicating or recording arm $e$ of the instrument.

As shown, the connections between the shafts C and E comprise an arm $C^2$ secured to the shaft C, an arm E' secured to the shaft E, a member F pivotally connected at $C^3$ to the arm $C^2$, and a link G pivotally connected at $E^2$ to the arm E' of the shaft E, and pivotally connected at G' to the member F. In accordance with the present invention, the parts are so proportioned that the axis of the pivotal connection C³ between the arm C² and member F coincides with the axis of the pivotal connection E² between the arm E' and the member G, when the shaft C occupies its no-flow position, that is, when the float B³ of the manometer B is in its zero level position. In such condition of the apparatus, the oscillation of the member F about the axis of the pivotal connection C³ does not tend to give movement to the arm E' and shaft E. On the occurrence of flow through the conduit A, the position of the float B³ changes and the shaft C is turned in the counter-clockwise direction. This moves the pivotal connection C³ between the arms C² and member F about the axis of the shaft C in the counter-clockwise direction. With the position of the lower portion of the member F controlled as hereinafter described, the shaft E and exhibiting arm e are then moved in the counter-clockwise direction away from the inner margin of the chart towards the outer margin of the latter.

The extent of angular movement imparted, as described, to the shaft E by motion given to the shaft C, depends upon the displacement of the pivotal connection G' between the members F and G from the axis of the shaft C. When as a result of flow in the conduit A, and the elevation of the float B³ above its zero position, the arm C² is displaced in the counter-clockwise direction from the position in which the axes of the pivotal connections C³ and E² coincide, any angular movement then given the member F about the pivot C³ increases or decreases the lateral displacement of the pivotal connection G' from the shaft C. This, in effect, increases or decreases the leverage through which the shaft C acts on the shaft E, accordingly as said displacement is increased or decreased. In consequence, counter-clockwise angular adjustment of the member F about the axis of the connection C³ gives movement to the arm E' of the exhibiting mechanism, and thereby to the pointer or pen arm e, in the same direction as does an increase in the rate of steam flow. Conversely, a clockwise angular adjustment of the member F moves the arm e in the same direction as does a decrease in the rate of steam flow.

In the apparatus shown in the drawings, the displacement of the pivotal connection G' from the shaft C is controlled by the joint action of a device H responsive to the pressure, and a device I responsive to the temperature of the fluid flowing through the conduit A. As shown, the device H is a Bourdon tube h in the form of a helix, having one end secured to the instrument framework of the instrument D, and having its other end connected to a shaft H' shown as axially disposed in the Bourdon tube helix. The static pressure of the fluid in the conduit A is transmitted to the stationary end of the Bourdon tube h by a pressure transmitting pipe h'. The helical Bourdon tube h is so wound that as the pressure in the conduit A increases or decreases, the resultant flexure of the Bourdon tube rotates the shaft H' in a counter-clockwise or clockwise direction, respectively. The shaft H' carries an arm H² on one end which is connected by a link H³ to a lever K pivoted at K' to the member F.

The temperature responsive device I is shown as generally similar to the pressure responsive device H, comprising parts i, I', I², corresponding to the parts h, H', H², respectively. The Bourdon tube helix i of the element I has its stationary end connected by a pressure transmitting pipe i' to a thermometer bulb i² located in the conduit A and containing an expansible fluid. The helix i is so wound that when the pressure in the helix increases due to an increase in temperature of the fluid, the shaft I' turns in the clockwise direction. The arm I² of the device is connected by a link I³ to the lever K at the opposite side of the pivot K' from that at which the lever K is connected to the link H³.

With the described arrangement, the angular movements of the arms H² and I², occurring on an increase in the pressure transmitted to the helix h through the pipe connection h' and an increase in the pressure transmitted to the helix i through the pipe i', each tend to turn the lever K about the axis of the connection K' in the clockwise direction. Conversely, a decrease in the pressure transmitted to the helix h and a decrease in the pressure transmitted to the helix i, each tend to turn the lever in the counter-clockwise direction. If the two arms of the lever K are of equal length and if the movements then given to the links H³ and I³ are equal, those movements neutralize one another so far as any tendency to bodily displacement of the pivotal connection K' is concerned. If at any time one of the links, for example the link H³, is given a movement in one direction in excess of the movement then given in the opposite direction to the other link, I³, the forces then acting on the lever K adjust its pivotal connection K' bodily in said one direction. Such bodily movement of the pivotal connection K' angularly adjusts the member F relative to the arm C² about the axis of their pivotal connection C³.

When the angular adjustment thus given to the member F is in the clockwise direction, the leverage through which the shaft C acts on the shaft E is diminished, the leverage being increased when the angular adjustment of the member F is in the counter-clockwise direction. Advantageously, and as shown, the parts are so proportioned that in the normal or average relative positions of the links H³ and I³, the axis of the pivotal connection K' is coincident with the axis of the shaft C, so that the relative positions of the member F and arm C² are not disturbed by movements which may then be given to the arm C² by the manometer float B³.

In the zero flow neutral compensation condition of the particular form of apparatus shown in Figs. 1, 2, and 3, the axes of the pivotal connections e³, C³, G' and K' appear in Fig. 2 as located at the corners of a geometrical figure which approximates a rectangle. That precise arrangement is not essential. To reduce errors due to the geometrical arrangement of the parts to a practical minimum, it is desirable, however, to so arrange the parts that throughout the operative range the angle between the plane including the axes of the connections K' and G' and the plane including the axes of the connections G' and E² should never vary greatly from a right angle. For the same reason, it is also desirable that the angle between the last mentioned plane and the plane including the axes of the connection E² and of the shaft E should never vary greatly from a right angle.

The device H with its operative connections to the member F constitute a means responsive to variations in the static pressure in the conduit A, for operating or adjusting the linkage mechanism connecting the part B⁷ to the shaft E of the exhibiting mechanism in accordance with variations in said pressure. Similarly, the device I with its operative connections to the member F constitute a means responsive to variations in the temperature of the fluid in the conduit A, for operating or adjusting said linkage mechanism in accordance with variations in said temperature. Furthermore, the devices H and I with their operative connections, including the lever K, to the member F, collectively constitute a compensating mechanism responsive to variations in the density of the fluid flowing through the conduit A, for operating or adjusting said linkage mechanism in accordance with variations in said density.

Ordinarily the devices H and I, and their connections to the lever K, are advantageously so proportioned that the lever K will turn on the pivot K' without displacing the latter, when the pressure and the temperature simultaneously vary in opposite directions in such relative amounts that the change in each neutralizes the effect of the change in the other on the relation between the weight rate of flow in the conduit A and the pressure differential transmitted to the manometer B.

To permit of a variation in the leverage with which the manometer acts on the exhibiting element provisions may be made for adjusting the pivotal connection G toward and away from the axis of the connection K'. As illustrated, such adjustment may be effected by shifting the lower end of the link G from one to another of series of closely spaced holes formed in the member F. Similarly, a plurality of pivot holes for the links $H^3$ and $I^3$ are formed in the arms $H^2$ and $I^2$ respectively, to permit of adjutments in the leverages with which the devices H and I respectively act on the member F. Similar provisions are shown for varying the leverages through which the arms $H^4$ and $I^4$ act through the links $H^5$ and $I^5$ on the pen arms $h^{10}$ and $i^{10}$, respectively.

In a flow meter used under conditions in which variations in temperature do not occur, or need not be taken into account, the element I is not required, and the position of the member F relative to the arm $C^2$ may then be controlled wholly by the pressure transmitted to the device H. Conversely, when the fluid flowing may vary in temperature without any significant pressure variations, or when pressure variations may be disregarded, the device H is unnecessary, and may be omitted, and the relative positions of the member F and arm $C^2$ may then be made subject to the exclusive control of the member I. When one of the devices H or I is not used, the lever K' may be dispensed with, and the other device left in service may be connected through its link $H^3$ or $I^3$ directly to the member F, preferably at or adjacent the pivotal connection K'.

As shown, the exhibiting arm e carries a stylus for making a record on a record chart L rotated at a suitable speed by a motor (not shown), forming a part of the instrument D. To clear the edge of the record chart, while at the same time keeping the instrument D compact, the arm e is shown as formed in a known manner, with a yoke portion e' extending around the edge of the record chart L and passing through an arc-shaped slot $D^2$ in the plate portion $D^3$ of the instrument framework, which forms a platen for the chart L. To facilitate calibrating adjustments of the arm e relative to the shaft E, the arm e is shown as separate from and pivotally connected to the yoke portion e' by a pivot pin $e^3$ and a clamping screw $e^2$, the latter being carried by the yoke portion e' and passing through an arc-shaped slot in the arm e.

Advantageously and as shown, the instrument D comprises pen arms $h^{10}$ and $i^{10}$ for recording on the chart L the values of the pressures and temperatures measured by the devices H and I, respectively. As shown, the pen arm $h^{10}$ comprises a yoke portion $h^{11}$ passing through the slot $D^2$ and connected to the hub of an arm $H^6$ journaled on the shaft E. The arm $H^6$ is oscillated about the axis of the shaft E by means of an arm $H^4$ secured to the shaft H' and a link $H^5$ connecting the arms $H^4$ and $H^6$. Similarly the pen arm $i^{10}$ comprises a yoke $i^{11}$ secured to the hub of an arm $I^6$ journaled on the shaft E and connected by a link $I^5$ to an arm $I^4$ secured to the shaft I'. In order that the relative positions of the arms $h^{10}$ and $i^{10}$ may more readily show the degree of steam superheat when the instrument is used to measure the flow of steam which may be superheated, the operating connections for these arms are advantageously so arranged, as shown, that an increase in steam pressure and a corresponding increase in steam temperature with no change in the degree of superheat, will give similar movements in the same direction to the arms $h^{10}$ and $i^{10}$.

The parts F and G form desirable means for connecting the exhibiting mechanism of a meter to an actuating mechanism therefor, in such manner as to permit the indicating mechanism to be given full scale range adjustment by different extents of movement of the actuating member. Such a connection while broadly novel with me is not claimed herein except in combination with other features, but is claimed in my co-pending application Serial No. 331,126, filed January 8, 1929.

Figure 4:
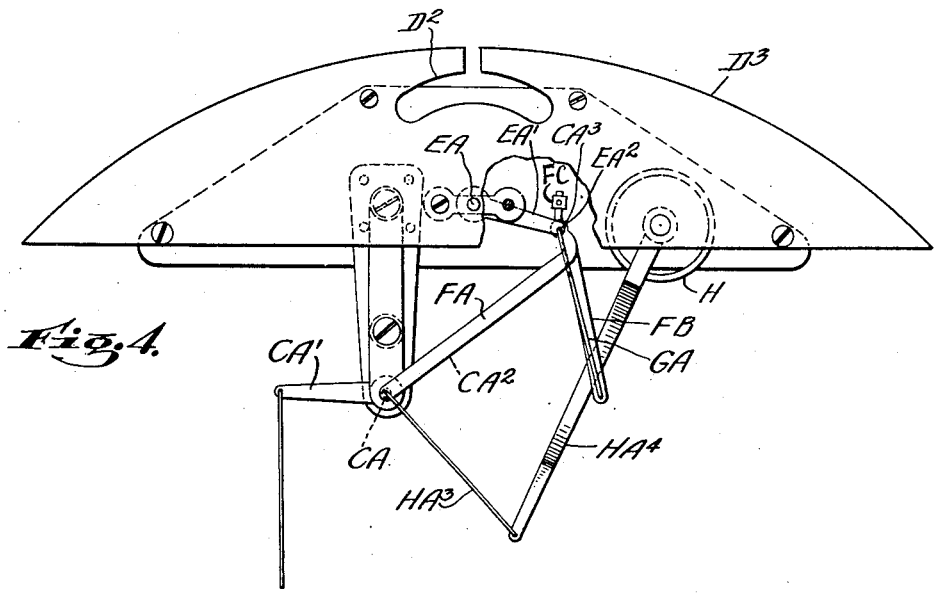
Fig. 4 is a partial elevation taken similarly to Fig. 2, illustrating a portion of an instrument of modified form.
Figure 5:
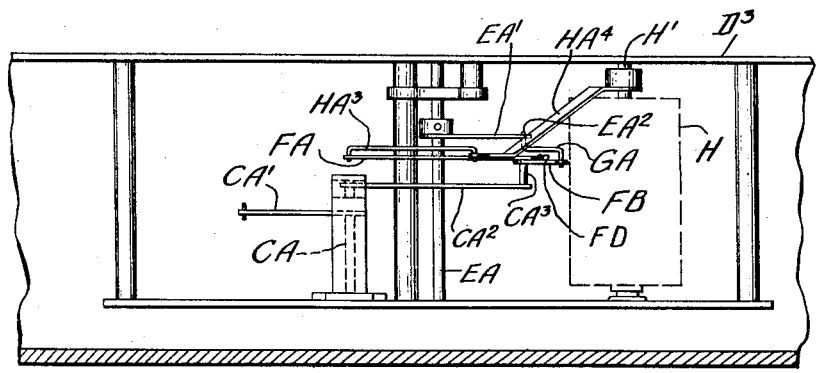
Fig. 5 is an inverted sectional plan view of the apparatus shown in Fig. 4.

In Figs. 4 and 5 I have illustrated an instrument similar in principle to that shown in Figs. 1, 2 and 3, embodying certain practically desirable features of construction and arrangement not found in Figs. 1, 2 and 3. In the construction shown in Figs. 4 and 5, the temperature responsive device I of Figs. 1, 2 and 3 is omitted, as it may be in the construction shown in Figs. 1, 2 and 3. In Figs. 4 and 5 the arm $HA^4$ of the pressure responsive device H is connected by a link $HA^3$ to the portion FA of a lever member comprising parts FA and FB which serve the same general purposes as the member F of the construction first described. As shown, the parts FA and FB are separately formed metal stamping parts, and are each pivotally mounted on a pivot pin $CA^3$ carried by an arm $CA^2$ carried by a shaft CA which also carries an arm CA'. The latter may be connected to the movable element of a manometer, as the arm C' is connected to the manometer float $B^3$ in the construction first described. After the parts are assembled and their proper angular relation is determined by an initial calibration of the instrument, the parts FA and FB are rigidly connected, as by solder indicated at FD, so that the parts FA and FB then form arms of a single lever element. The end of the lever arm FB remote from the pivot pin $CA^3$ is pivotally connected to one end of a link member GA, the other end of which is pivotally connected to an indicator actuating arm EA' which corresponds in purpose, and may be similar in form to the arm E' of the apparatus shown in Figs. 1, 2 and 3.

The effect of the above described angular adjustment of the parts FA and FB preparatory to the rigid connection of the latter in the initial calibration of the apparatus is to insure the proper effect of the helix H on the angular position of the shaft EA and pen arm or indicator carried thereby. This adjustment is analogous to the pointer adjustment heretofore effected in instruments in which a pen is actuated by a Bourdon tube helix, by bodily adjustment of the latter, as disclosed in the Brown & Wagner Patent No. 1,390,273, granted September 13, 1921.

To minimize any gravital effect exerted by the compound lever element FA, FB on the pressure responsive device H, said element is advantageously provided with a counterbalance FC which may be adjusted to bring the center of gravity of the element approximately into the line of the axis of the pivot pin $CA^3$.

The operation of the apparatus shown in Figs. 4 and 5 is substantially identical with that of the apparatus of Figs. 1, 2 and 3. When the pressure transmitted to the device H is the normal pressure for which the apparatus is calibrated the axis of the pivotal connection between the parts FA and $HA^3$ is practically coincident with the axis of the shaft CA, and in the zero flow condition, the axis of the pivotal connection $EA^2$ between the arm Ea' and the link GA, is practically coincident with the axis of the pivot pin $CA^3$. In the construction shown in Figs. 4 and 5 the angle between the plane including the axes of the pivotal connections between FA and $HA^3$ and between FB and GA, and the plane including the axis of the last mentioned pivotal connection and the axis of the pivotal connection $EA^2$ should not differ greatly from a right angle throughout the range of relative movements of the parts. In Figs. 4 and 5 also, the angle between the plane including the axes of the pivotal connections of FB and GA and of GA and EA', and the plane including the axis of the last mentioned pivotal connection and the axis of the shaft EA never differs much from a right angle. The maximum departure of said angle from a right angle is in the zero flow condition of the apparatus, shown in Figs. 4 and 5. As the flow increases the angle first approaches a right angle, and then on a further increase in flow the angle may become less than a right angle.

An important practical advantage of the apparatus disclosed distinguishing it from all prior forms of flow measuring apparatus with compensating provisions of which I have knowledge, is that all of its relatively movable parts are connected by pivots so that their relative movements are turning movements, whereas in each of said prior forms some of the relatively movable parts are connected by pin and slot connections or analogous connections in which relatively movable parts of the mechanism are in sliding engagement with one another. By employing pivotal or equivalent connections between all the relatively movable parts, I avoid a source of lost motion and resultant error which is practically inherent in apparatus including pin and slot or analogous connections. As those skilled in the art will understand, the force transmitting parts of an instrument of this type are necessarily of light weight and delicate construction, and for this reason as well as from the standpoint of cost, it is not practically possible to avoid lost motion in such an instrument comprising parts connected by pin and slot connections in sliding engagement with one another. In addition, by employing pivotal connections throughout in the mechanisms of this invention, the force required to actuate the mechanism is less than would be the case for equally satisfactory operation of mechanisms employing pin and slot connections in general. This reduction of friction by virtue of the pivotal connections is a very important practical advantage in many instances, and especially where the gas being metered is under low pressure and where the force available for effecting the compensation is small.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent is:—

1. A flow meter having means responsive to variations in rate of flow and including a part movable in proportion to the rate of flow, a member, linkage mechanism interconnecting said part and member so as to position the member in accordance with the rate of flow, a second mechanism responsive to variations in the density of the fluid being metered for operating said linkage mechanism so as to vary the ratio of movement of the member in response to actuation by the said part, the points of interconnection within the linkage mechanism being solely pivots.

2. A flow meter having means responsive to variations in the rate of flow and including a part movable in proportion to the rate of flow, linkage mechanism operated by said part to exhibit the rate of flow, a device responsive to a condition of the fluid being metered, means interconnecting said device with said mechanism to so vary the actuation of the mechanism by said part as to compensate the meter response to rate of flow for variations in said condition, said last mentioned means and said mechanism comprising relatively movable parts and pivots, the latter constituting the sole interconnections between said relatively movable parts.

3. A flow meter having an element adapted to be moved in response to volume rate of flow of a fluid, instrument mechanism, a pivotal connection between said mechanism and element whereby said mechanism is operable by said element, a device responsive to variations in the static pressure of the fluid, and means operable by said device for adjusting the instrument mechanism relative to the element to compensate the instrument mechanism for variations in pressure, whereby the instrument mechanism operates in accordance with weight rate of flow of fluid, said means and said mechanism comprising relatively movable parts and pivots, the latter constituting the sole interconnections between said relatively movable parts.

4. A flow meter having an element adapted to be moved in response to volume rate of flow of a fluid, instrument mechanism, a pivotal connection between said mechanism and element whereby said mechanism is operable by said element, a device responsive to variations in the temperature of the fluid, and means operable by said device for adjusting the instrument mechanism relative to the element to adjust the instrument mechanism for variations in temperature in the fluid, whereby the instrument mechanism operates in accordance with weight rate of flow of fluid, said means and said mechanism comprising relatively movable parts and pivots, the latter constituting the sole interconnections between said relatively movable parts.

5. A flow meter having an element adapted to be moved in response to volume rate of flow of a fluid, instrument mechanism, a pivotal connection between said mechanism and element whereby said mechanism is operable by said element, mechanisms responsive to variations in the static pressure of the fluid and to variations in the temperature of the fluid and operable to adjust said instrument mechanism relative to said element to thereby compensate said instrument mechanism for variations in pressure and temperature of the fluid, whereby the instrument mechanism operates in accordance with the weight rate of flow of fluid, said mechanisms comprising relatively movable parts and pivots, the latter constituting the sole interconnections between said relatively movable parts.

6. In a flow meter, the combination of one part adapted to move in response to variations in a rate of fluid flow, a second part adapted to move in accordance with said rate of flow and in accordance with changes in the quality of the fluid flowing and without bias opposing its movements, a mechanism consisting of lever and link parts pivotally connected to one another and to said one and second parts through which movements of said one part give corresponding movements to said second part, a third part adapted to move in response to changes in quality of the fluid flowing and connected to a part of said mechanism to adjust the latter and thereby vary the ratio between the relative movements of said one and said second parts in response to said quality change continuously as said change occurs and part connecting means confining the movement of each of said parts relative to each other part connected thereto to a turning movement.

7. In a flow meter, the combination of one part adapted to move in response to variations in a rate of fluid flow, a second part to be moved in accordance with said rate of flow and in accordance with changes in qualities of the fluid flowing, a mechanism consisting of lever and link parts pivotally connected to one another and to said one and second parts through which movements of said one part give corresponding movements to said second part, a third part adapted to move in response to changes in one quality of the fluid flowing, a fourth part adapted to move in response to changes in a second quality of said fluid, said third and fourth parts being each connected to a part of said mechanism to adjust the latter and each thereby varying the ratio between the relative movements of said one and said second parts in response to changes in the corresponding fluid quality continuously as said change occurs, and part connecting means substantially confining the movement permitted each of said parts relative to a part connected thereto, to a turning movement.

8. In a flow meter, the combination of a member adapted to move in response to variations in a rate of fluid flow, an element adapted to move angularly about a fixed axis, a mechanism consisting of parts connected to one another and to said member and element through which movements of said member give corresponding movements to said element, said parts including an adjustable part, a link and an element pivoted to turn about a fixed axis displaced from the axis about which the first mentioned element turns, a device adapted to move in response to changes in quality of the fluid flowing and connected to said adjustable part to adjust said mechanism and thereby vary the ratio between the relative movements of said member and said first named element in response to said quality change, said link having a pivotal connection at one end with the first named of the two said elements and having a pivotal connection at its other end with said adjustable part, the latter being mounted on the second of said two elements for adjustment relative thereto by said device to move the axis of the last mentioned pivotal connection toward and away from the fixed axis about which the last mentioned element turns along an adjustment path which extends circularly about the axis of the first mentioned pivotal connection when said elements occupy their zero flow positions.

9. In a meter, the combination of a member adapted to move in response to variations in a quantity measured, an element adapted to move angularly about a fixed axis, a mechanism consisting of parts connected to one another and to said member and element through which movements of said member give corresponding movements to said element, said parts including an adjustable part, a link and an element pivoted to turn about a fixed axis displaced from the axis about which the first mentioned element turns, a device adapted to move in response to changes in a second quantity and connected to said adjustable part to adjust said mechanism and thereby vary the ratio between the relative movements of said member and said first named element in response to changes in said second quantity, said link having a pivotal connection at one end with the first named of the two said elements and having a pivotal connection at its other end with said adjustable part, the latter being mounted on the second of said two elements for adjustment relative thereto by said device to move the axis of the last mentioned pivotal connection toward and away from the fixed axis about which the last mentioned element turns along an adjustment path which extends circularly about the axis of the first mentioned pivotal connection when said elements occupy their zero positions corresponding to zero value of the first mentioned quantity.

10. In a flow meter, the combination of a member adapted to move in response to variations in a rate of fluid flow, an element adapted to move angularly about a fixed axis, a mechanism consisting of parts connected to one another and to said member and element through which movements of said member give corresponding movements to said element, said parts including an adjustable part, a link and an element pivoted to turn about a fixed axis displaced from the axis about which the first mentioned element turns, a device adapted to move in response to changes in quality of the fluid flowing and connected to said adjustable part to adjust said mechanism and thereby vary the ratio between the relative movements of said member and said first named element in response to said quality change, said link having a pivotal connection at one end with the first named of the two said elements and having a pivotal connection at its other end with said adjustable part, and the latter being pivotally connected to the second of said two elements for angular adjustment relative thereto by said device to move the axis of the second mentioned pivotal connection toward and away from the fixed axis about which the last mentioned element turns along an adjustment path which extends circularly about the axis of the first mentioned pivotal connection when said elements occupy their zero flow positions.

11. In a flow meter, the combination of a member adapted to move in response to variations in a rate of fluid flow, an element adapted to move angularly about a fixed axis, a mechanism consisting of parts connected to one another and to said member and element through which movements of said member give corresponding movements to said element, said parts including an adjustable part, a link and an element pivoted to turn about a fixed axis displaced from the axis about which the first mentioned element turns, a device adapted to move in response to changes in one quality of the fluid flowing, a second device adapted to move in response to a change in a second quality of said fluid, and a lever separately pivotally connected to said devices and to said adjustable part through which said devices adjust said mechanism and thereby vary the ratio between the relative movements of said member and said first named element in response to said quality changes, said link having a pivotal connection at one end with the first named of the two said elements and having a pivotal connection at its other end with said adjustable part, the latter being mounted on the second of two elements for adjustment relative thereto by said devices to move the axis of the last mentioned pivotal connection toward and away from the fixed axis about which the last mentioned element turns in a direction extending circularly about the axis of the first mentioned pivotal connection when said elements occupy their zero flow positions.

12. In a meter the combination of a member adapted to move in response to variations in a quantity measured, an element adapted to move angularly about a fixed axis, a mechanism consisting of parts connected to one another and to said member and element through which movements of said member give corresponding movements to said element, said parts including an element pivoted to turn about a fixed axis displaced from the axis about which the first mentioned element turns, and an adjustable connection between said elements comprising two parts connected to one another by a hinged connection, one of said parts having a pivotal connection with one of said two elements and the other part having a pivotal connection with the other of said two elements, the axes of said pivotal connections being each parallel to, and displaced from the axis of said hinged connection, a device adapted to move in response to changes in a second quantity and connected to said adjustable connection to move the hinged connection thereof toward and away from the fixed axis, about which the second named element turns, along an adjustment path which extends circularly about the axis of the pivotal connection between the first named element and the part of said hinged connection pivotally connected thereto, when said elements occupy their zero positions, and thereby vary the ratio between the relative movements of said member and the first named element in response to changes in said second quantity.

13. In a flow meter, the combination of one part adapted to move in response to variations in the rate of a fluid flow, a second part adapted to move, a mechanism consisting of lever and link parts pivotally connected to one another and to said one and second parts through which movements of said one part give corresponding movements to said second part in a predetermined ratio, a third part adapted to move in response to changes in quality of the fluid flowing and connected to a part of said mechanism to turn about an axis relative to the last mentioned part to adjust the latter and thereby vary the said ratio between the relative movements of said one and second parts in response to said quality change continuously as said change occurs and part connecting means confining the movement of each of said parts relative to each other part connected thereto to a turning movement, said third part being so disposed and related to said one and second parts that said axis is adapted to occupy a normal position corresponding to a predetermined quality, in which position movement of said third part about said axis is ineffective to vary the said ratio between the relative movements of said one and second parts.

14. In a meter, the combination of a pivoted member adapted to turn about an axis in response to variation in a quantity measured, an element adapted to move angularly about a fixed axis, a mechanism consisting of parts connected to one another and to said member and element through which movements of said member gives corresponding movements to said element and including a lever part adapted to turn about the first mentioned axis, a second member pivoted at one end to said lever part and having its other end connected to said element at a distance from the first mentioned axis whereby said second member forms a lever through which said element may be moved, a third member adapted to move in response to variations in a second quantity measured, and means including a lever connecting said second and third members and moved by said third member to vary said distance and thereby vary the leverage with which said second member acts on said element, in accordance with the variations in the quantity to which said third member is responsive.

15. In an instrument, an element to be moved, a member for moving said element, interconnected means for modifying the movement given said element by said member comprising a first pressure responsive tube, a second pressure responsive tube, a lever pivotally connected to the first tube at one pivotal point and pivotally connected to the second tube at a second pivotal point, the relative positions of the lever, tubes and connections being such that a movement of the lever by the first tube rotates the lever about the second pivotal point and a movement of the lever by the second tube rotates the lever about the first pivotal point, and a second lever pivotally connected to the first mentioned lever at a third pivotal point intermediate said first and second pivotal points and adapted to be oscillated about said third pivotal point by said member to thereby move said element.

16. In a meter, the combination of one movable part adapted to move in response to variations in the rate of a fluid flow, a second movable part, a mechanism consisting of lever and link parts pivotally connected to one another and to said one and second parts through which movements of said one part give corresponding movements to said second part in a predetermined ratio, a third part adapted for independent movement, and connected to a part of said mechanism to adjust the latter and thereby vary the said ratio between the relative movements of said one and second parts in response to a change in the quality of said fluid continuously as said change occurs, and part connecting means confining the movement of each of said parts relative to each other part connected thereto to a turning movement, said third part being so disposed and related to said one and second parts that the axis of the turning movement of said third part relative to the said part of said mechanism is adapted to occupy a predetermined normal position, in which position the said turning movement of said third part is ineffective to vary the said ratio between the relative movements of said one and second parts.

17. In apparatus of the character specified, the combination of an element having a stationary pivotal axis, means for adjusting said element angularly about its pivotal axis in accordance with changes in the value of a quantity, a second element having a stationary pivotal axis laterally displaced from the first mentioned axis, a motion transmitting connection between said elements comprising one member pivotally connected to one, and a second member pivotally connected to the other of the two elements, the axis of the pivotal connection between said one member and said one element being a floating axis laterally displaced from the pivotal axis of the latter, and the axis of the pivotal connection between said second member and said other element being a floating axis laterally displaced from the pivotal axis of the latter, said members being pivotally connected to one another to turn relative to one another about a third floating axis laterally displaced from each of the previously mentioned floating axes, and means independent of the angular position of the first mentioned element for adjusting said transmitting connection in accordance with changes in value of a second quantity.

18. In a flow meter, the combination of a member adapted to move in response to variations in a rate of fluid flow, an element adapted to move angularly about a fixed first axis, a mechanism consisting of parts connected to one another and to said member and element through which movements of said member give corresponding movements to said element, said parts including a floating lever pivotally connected to said member to turn about a second axis in fixed relation with said member and a link pivotally connected at one end to said lever to turn relatively to the latter about a third axis in fixed relation with said lever and displaced from said second axis and pivotally connected at its opposite end to said element to turn relatively thereto about a fourth axis, a device adapted to move in response to changes in quality of the fluid flowing and connected to said lever at a distance from said second axis and at a distance from said third axis, the distance between said second axis and said third axis being equal to the distance between said third axis and said fourth axis, and said element, member, lever and link being so formed and disposed that in the zero flow condition of said meter, said second axis and said fourth axis coincide.

19. In a flow meter, the combination of a member adapted to move angularly about a fixed first axis in response to variations in a rate of fluid flow, an element adapted to move angularly about a fixed second axis, a mechanism consisting of parts connected to one another and to said member and element through which movements of said member give corresponding movements to said element, said parts including a floating lever pivotally connected to said member to turn about a third axis in fixed relation with said member, and a link pivotally connected at one end to said lever to turn relatively to the latter about a fourth axis in fixed relation with said lever and displaced from said third axis and pivotally connected at its opposite end to said element to turn relatively thereto about a fifth axis, a device adapted to move in response to changes in quality of the fluid flowing and a pivotal connection between said device and lever, the axis of said pivotal connection being in fixed relation with said lever and displaced from said third axis and from said fourth axis, the distance between said third axis and said fourth axis being equal to the distance between said fourth axis and said fifth axis, and said element, member, lever and link being so formed and disposed that in the zero flow condition of said meter, said third axis and said fifth axis coincide, and that with a particular predetermined value of said condition said first axis and the axis of said pivotal connection coincide.

THOMAS R. HARRISON.